(12) United States Patent  
Chen

(10) Patent No.: US 7,481,529 B1  
(45) Date of Patent: Jan. 27, 2009

(54) ASSEMBLING STRUCTURE FOR GLASSES

(76) Inventor: Chih-Ming Chen, No. 19, Alley 4, Lane 234, Sec. 5, Her Mei Road, Tainan City (TW)

( * ) Notice: Subject to any disclaimer, the term of this patent is extended or adjusted under 35 U.S.C. 154(b) by 0 days.

(21) Appl. No.: 11/902,672

(22) Filed: Sep. 25, 2007

(51) Int. Cl.  
*G02C 1/00* (2006.01)

(52) U.S. Cl. .............................. 351/83; 351/86; 351/131

(58) Field of Classification Search ............. 351/83–88, 351/124, 131–13  
See application file for complete search history.

(56) References Cited

U.S. PATENT DOCUMENTS 5,815,235 A * 9/1998 Runckel ....................... 351/92  
5,880,806 A * 3/1999 Conway ....................... 351/86

\* cited by examiner

*Primary Examiner*—Huy K Mai  
(74) *Attorney, Agent, or Firm*—Rosenberg, Klein & Lee

(57) ABSTRACT

A pair of glasses includes two lenses received in two lens receiving portions of a frame. A groove is defined in the frame and between tops of the lens receiving portions. Each lens receiving portion includes outer and rear stops for retaining the lenses. A movable stop includes two legs movably coupled with lower ends of inner sides of the lens receiving portions. The movable stop is movable between an engaged position in which a top portion of the movable stop is engaged with the groove and in which forward inclination of the lenses are stopped by the legs and a disengaged position in which the top portion of the movable stop is disengaged from the groove of the frame and in which insertion or removal of the lenses into or from the lens receiving portions is allowed.

7 Claims, 4 Drawing Sheets

ASSEMBLING STRUCTURE FOR GLASSES

BACKGROUND OF THE INVENTION

The present invention relates to an assembling structure for a pair of glasses and, more particularly, to an assembling structure between two lenses and a frame of a pair of glasses.

A typical pair of glasses includes a frame having two lens receiving portions and two lenses embedded in or forcibly inserted into the lens receiving portions. Another typical pair of glasses includes a single lens embedded in a frame having a single lens receiving portion. In either case, the lens has a size slightly larger than that of the lens receiving portion, and the lens receiving portion is made of resilient material to allow forcible insertion of the lens. However, breakage of the lens and/or the lens receiving portion occurs easily due to improper application of force.

In a variation, a perimeter of the lens receiving portion has a movable portion that can be moved to an open position to allow easy insertion of the lens, and screws are utilized to fix the movable portion in a position preventing disengagement of the lens. However, the assembling procedure is troublesome.

A need exists in an assembling structure for a pair of glasses that allows easy assembly while reliably retaining the lenses in place.

BRIEF SUMMARY OF THE INVENTION

The present invention solves this need and other problems in the field of assembling structures by providing a pair of glasses including two lenses and a frame having two lens receiving portions respectively receiving the lenses. Each lens receiving portion includes an inner side with a lower end. Each lens receiving portion further includes an inner periphery having an outer section distant to the inner side. A groove is defined in the frame and between tops of the lens receiving portions. Each lens receiving portion includes an outer stop on the outer section of the inner periphery thereof for preventing one of the lenses from falling out of the lens receiving portion via the outer section. Each lens receiving portion further includes a rear stop on the inner periphery thereof for preventing rearward inclination of one of the lenses. A movable stop is movably mounted between the inner sides of the lens receiving portions. The movable stop includes a resilient top portion and two legs. The legs are respectively and movably coupled with the lower ends of the inner sides of the lens receiving portions. The movable stop is movable between an engaged position in which the top portion of the movable stop is engaged with the groove of the frame and a disengaged position in which the top portion of the movable stop is disengaged from the groove of the frame, with the legs being in a position preventing the lenses from inclining forward when the movable stop is in the engaged position, and with the legs being in another position allowing insertion or removal of the lenses into or from the lens receiving portions when the movable stop is in the disengaged position.

Preferably, the movable stop is substantially inverted V-shaped.

Preferably, the groove of the frame includes a recessed portion in a bottom wall defining the groove, and the top portion of the movable stop includes a hook releasably engaged with the recessed portion for retaining the movable stop in the engaged position.

In a preferred form, each leg is pivotably coupled with the lower end of the inner side of one of the lens receiving portions by a pin, allowing the movable stop to be pivotable between the engaged position and the disengaged position.

In another preferred form, with each leg is interconnected with the lower end of the inner side of one of the lens receiving portions by a soft, flexible connecting portion, allowing the movable stop to be movable between the engaged position and the disengaged position.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 3A shows an enlarged view of a circled portion A of FIG. 3 depicting an alternative arrangement of the movable stop.

FIG. 3B shows an enlarged view of another circled, cutaway portion B of FIG. 3 depicting an outer stop.

Figure 1:
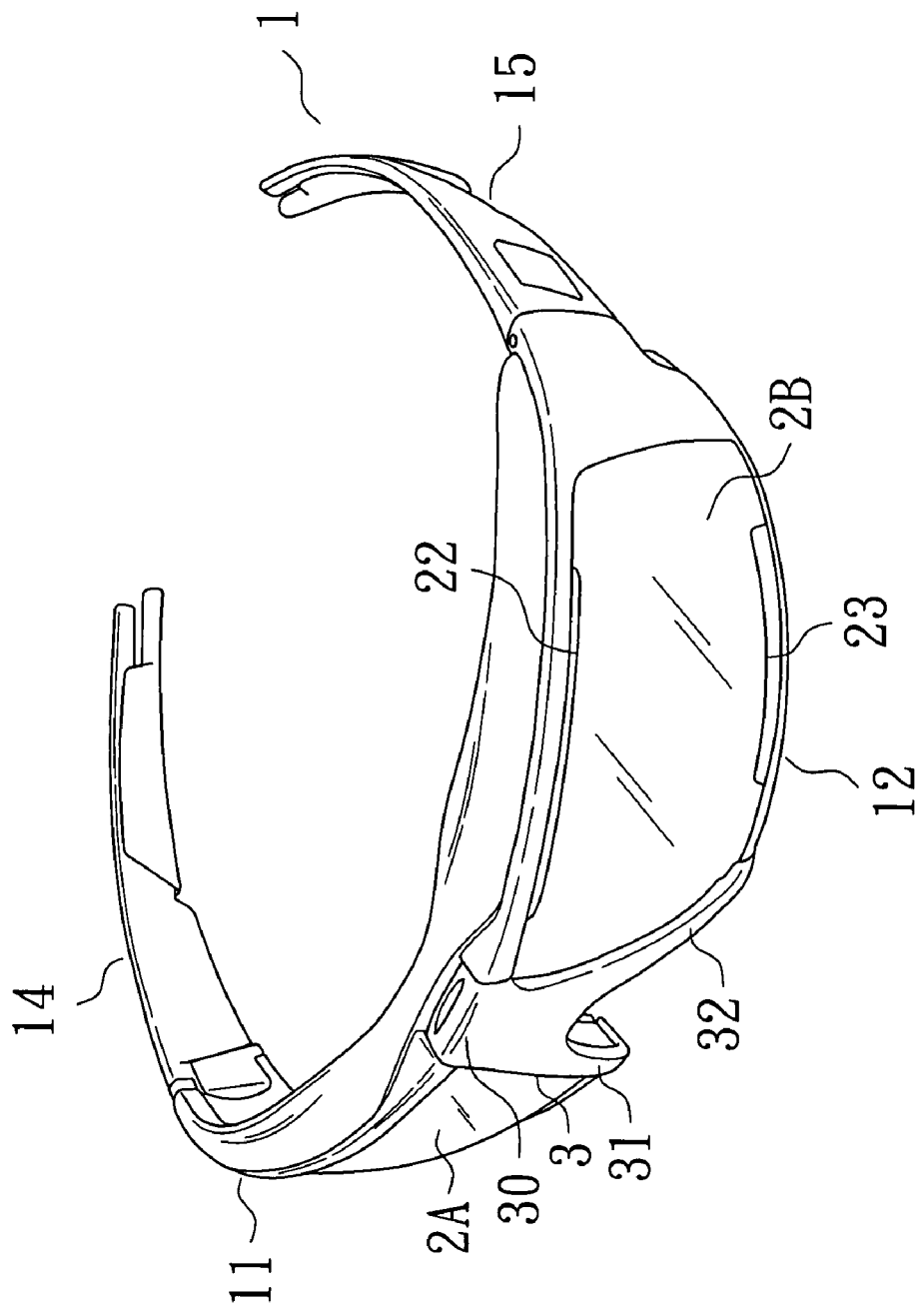
FIG. 1 shows a perspective view of a pair of glasses according to the preferred teachings of the present invention with a movable stop in an engaged position.
Figure 2:
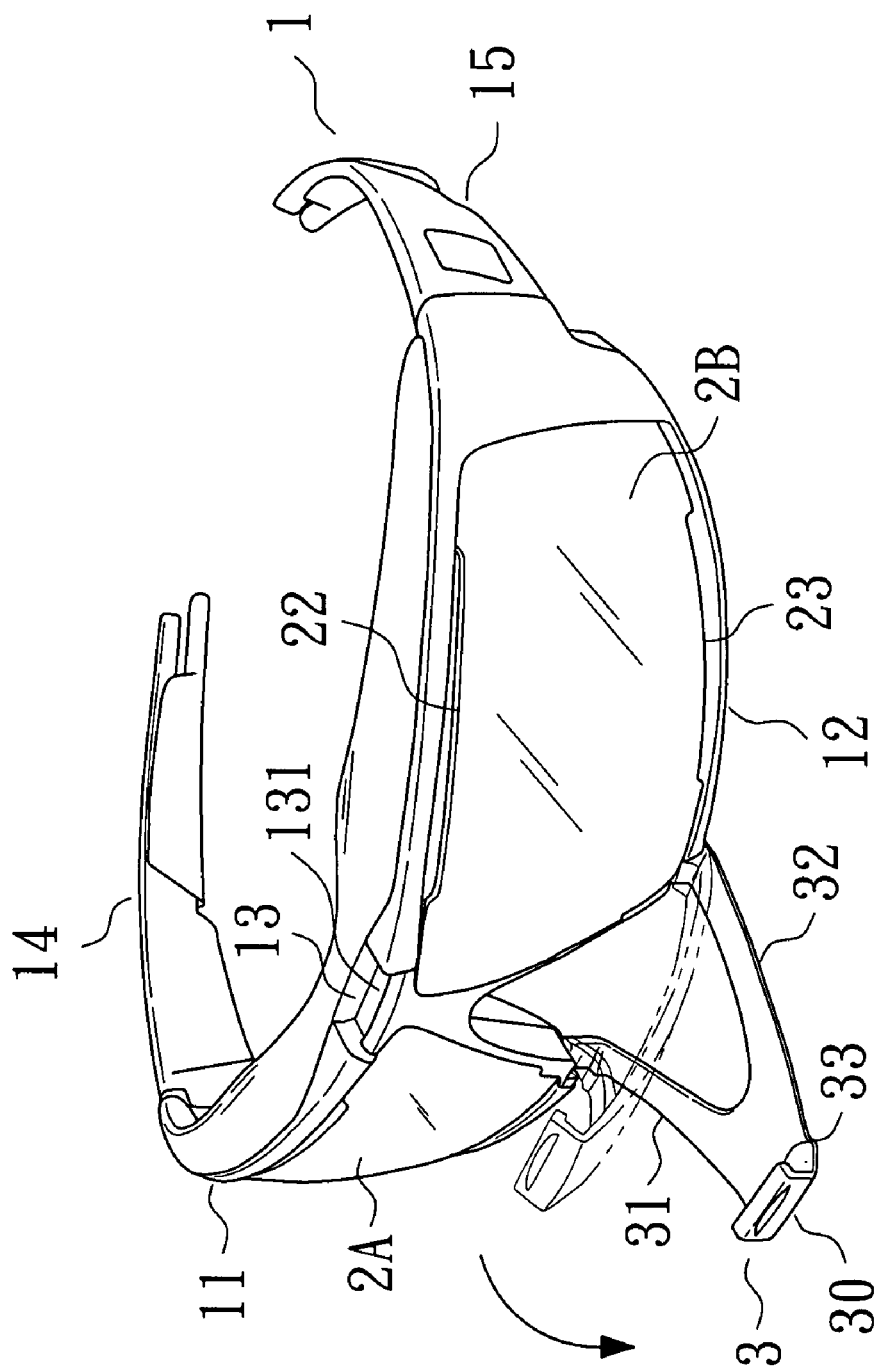
FIG. 2 shows a perspective view of the pair of glasses of FIG. 1 with the movable stop in a disengaged position.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A pair of glasses according to the preferred teachings of the present invention is shown in the drawings. According to the preferred form shown, the pair of glasses includes a frame 1 having two sides. A temple 14, 15 extends rearward from each side of the frame 1. The temples 14 and 15 can be replaced by other wearing elements such as a head strap. The frame 1 includes two lens receiving portions 11 and 12 each defining a compartment for receiving a lens 2A, 2B. Each lens receiving portion 11, 12 includes an outer stop 122 formed on an outer section of an inner periphery defining the compartment. With reference to FIG. 3B, the outer stop 122 includes a lateral edge 122A in contact with an outer lateral edge 26 of one of the lenses 2A and 2B and a front edge 122B in contact with an outer end 28 of a front face of one of the lenses 2A and 2B. Disengagement of the lens 2A, 2B from the outer section of the inner periphery of the lens receiving portion 11, 12 is avoided (see FIG. 4). Each lens receiving portion 11, 12 further including a rear stop 113 on the inner periphery thereof. In the preferred form shown, the rear stop 113 is formed on a bottom section of the inner periphery of the lens receiving portion 11, 12 and is in contact with one of the lenses 2A and 2B for preventing rearward inclination of the lens 2A, 2B, thereby preventing the lens 2A, 2B from falling out of the lens receiving portion 11, 12 via the rear of the lens receiving portion 11, 12. An optional rear stop 121 may be formed on an inner section of the inner periphery of the lens receiving portion 11, 12 for assisting in preventing rearward inclination of the lens 2A, 2B. A groove 13 is defined in the frame 1 and between tops of the lens receiving portions 11 and 12. A recessed portion 131 is defined in a bottom wall of the groove 13. A plurality of spaced protrusions 111, 112 are formed on each of the bottom section and a top section of the inner periphery of each of the lens receiving portions 11 and 12. Each lens 2A, 2B includes a recessed portion 22, 23 in each of a top edge and a lower edge thereof. When the lenses 2A and 2B are received in the lens receiving portions 11 and 12, the protrusions 111 and 112 are respectively received in the recessed portions 22 and 23. The gaps between the protrusions 111 and 112 provide a ventilation effect without causing discomfort to the eyes of the wearer due to excessive wind (see FIG. 4).

A movable stop 3 is movably mounted between inner sides of the lens receiving portions 11 and 12. In the preferred form shown, the movable stop 3 is substantially inverted V-shaped and includes a resilient top portion 30 in the form of a hook 33 and two legs 31 and 32. Each leg 31, 32 is movably coupled with the lower end of the inner side of one of the lens receiving portions 11 and 12. The movable stop 3 is movable between an engaged position and a disengaged position. When in the engaged position, the top portion 30 of the movable stop 3 is engaged with the groove 13 of the frame 1 whereas the hook 33 of the top portion 30 of the movable stop 3 is engaged in the recessed portion 131 of the groove 13 of the frame 1. The top portion 30 of the movable stop 3 can be forcibly inserted into and engaged in the groove 13 of the frame 1 due to resiliency of the top portion 30. Furthermore, each leg 31, 32 is in a position in contact with an inner edge of one of the lenses 2A and 2B, preventing the lens 2A, 2B from inclining forward. On the other hand, when the movable stop 3 is in the disengaged position, the legs 31 and 32 are in a position allowing insertion or removal of the lenses 2A and 2B into or from the lens receiving portions 11 and 12.

Figure 3:
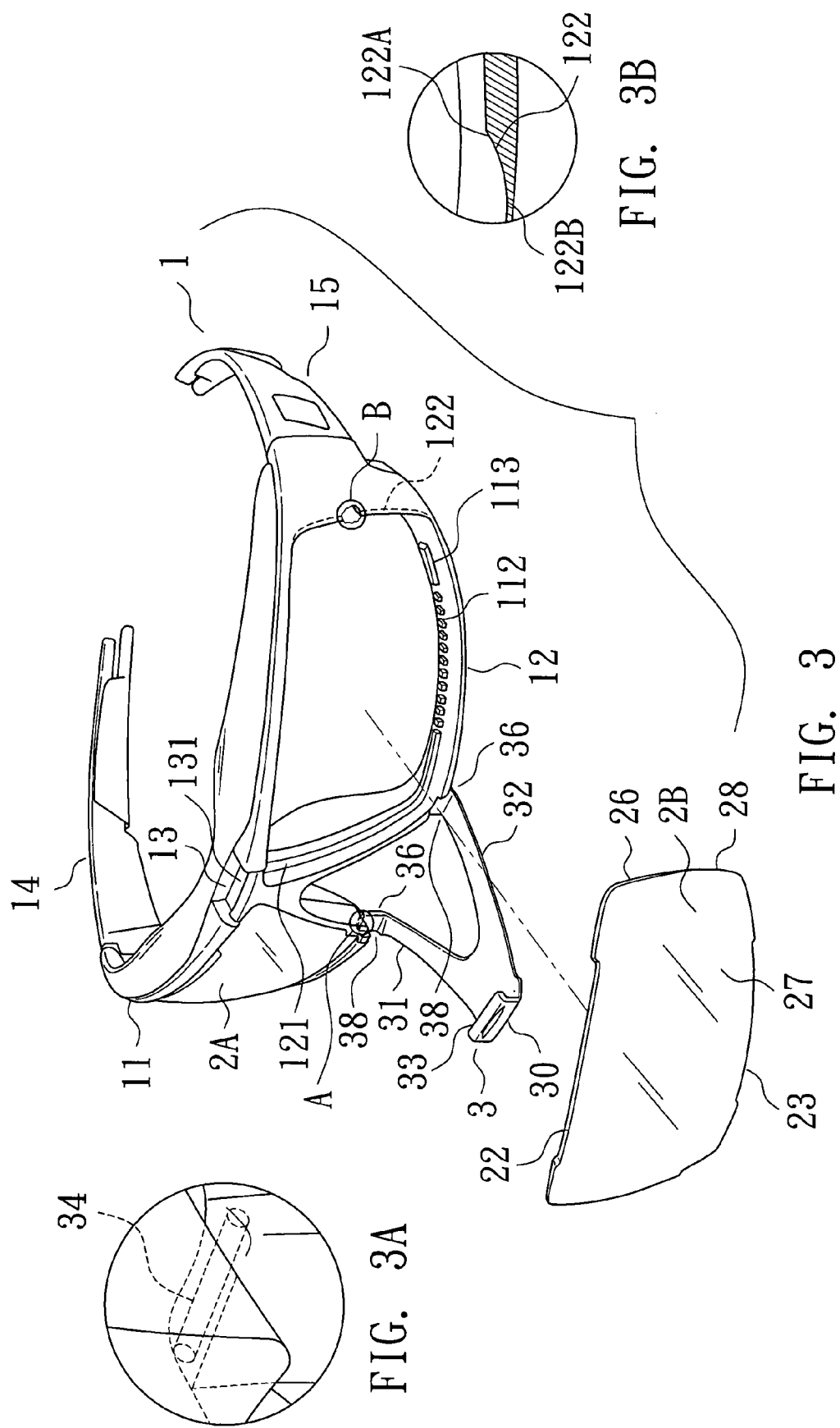
FIG. 3 shows a partially exploded perspective view of the pair of glasses of FIG. 1.
Figure 4:
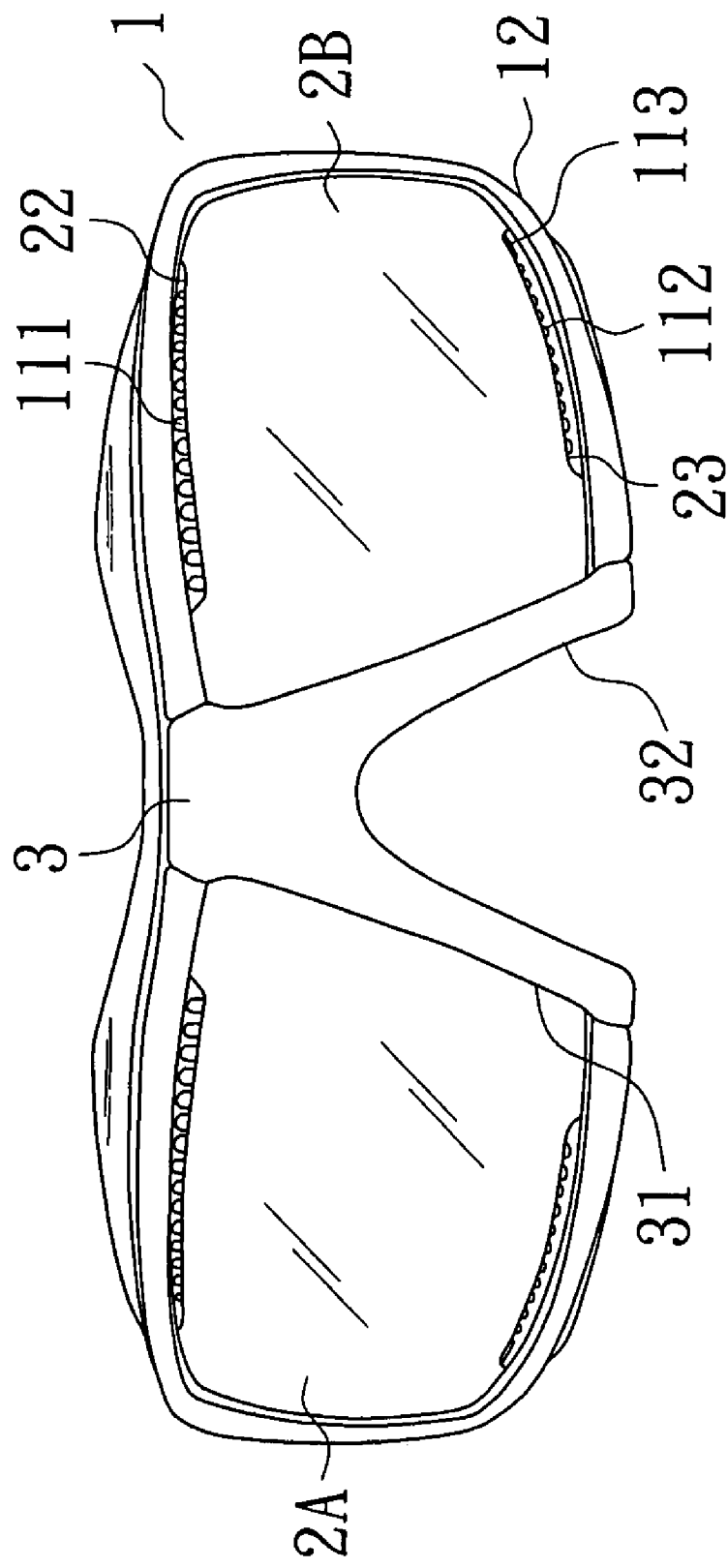
FIG. 4 shows a front view of the pair of glasses of FIG. 1.

In a preferred form shown in FIG. 3, each leg 31, 32 is interconnected with the lower end of the inner side of one of the lens receiving portions 11 and 12 by a soft, flexible connecting portion 36 that is bendable along a line 38 allowing the movable stop 3 to be movable between the engaged position and the disengaged position.

In another preferred form shown in FIG. 3A, each leg 31, 32 is pivotably coupled with the lower end of the inner side of one of the lens receiving portions 11 and 12 by a pin 34, allowing the movable stop 3 to be pivotable between the engaged position and the disengaged position.

The pair of glasses according to the preferred teachings of the present invention provides an assembling structure allowing easy assembly or detachment of the lenses 2A and 2B while positioning the lenses 2A and 2B after assembly without the risk of breakage of the lenses 2A and 2B and/or the lens receiving portions 11A and 11B.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of glasses comprising:
two lenses;
a frame including two lens receiving portions respectively receiving the lenses, with each said lens receiving portion including an inner side with a lower end, with each said lens receiving portion further including an inner periphery having an outer section distant to the inner side, with a groove being defined in the frame and between tops of the lens receiving portions, with each said lens receiving portion including an outer stop on the outer section of the inner periphery thereof for preventing one of the lenses from falling out of the lens receiving portion via the outer section, with each said lens receiving portion further including a rear stop on the inner periphery thereof for preventing rearward inclination of one of the lenses; and
a movable stop movably mounted between the inner sides of the lens receiving portions, with the movable stop including a resilient top portion and two legs, with the legs being respectively and movably coupled with the lower ends of the inner sides of the lens receiving portions, with the movable stop being movable between an engaged position in which the top portion of the movable stop is engaged with the groove of the frame and a disengaged position in which the top portion of the movable stop is disengaged from the groove of the frame, with the legs being in a position preventing the lenses from inclining forward when the movable stop is in the engaged position, and with the legs being in another position allowing insertion or removal of the lenses into or from the lens receiving portions when the movable stop is in the disengaged position.

2. The pair of glasses as claimed in claim 1, with the movable stop being substantially inverted V-shaped.

3. The pair of glasses as claimed in claim 2, with each said leg being pivotably coupled with the lower end of the inner side of one of the lens receiving portions by a pin, allowing the movable stop to be pivotable between the engaged position and the disengaged position.

4. The pair of glasses as claimed in claim 2, with each said leg being interconnected with the lower end of the inner side of one of the lens receiving portions by a soft, flexible connecting portion, allowing the movable stop to be movable between the engaged position and the disengaged position.

5. The pair of glasses as claimed in claim 1, with the groove of the frame including a recessed portion in a bottom wall defining the groove, and with the top portion of the movable stop including a hook releasably engaged with the recessed portion for retaining the movable stop in the engaged position.

6. The pair of glasses as claimed in claim 1, with each said leg being pivotably coupled with the lower end of the inner side of one of the lens receiving portions by a pin, allowing the movable stop to be pivotable between the engaged position and the disengaged position.

7. The pair of glasses as claimed in claim 1, with each said leg being interconnected with the lower end of the inner side of one of the lens receiving portions by a soft, flexible connecting portion, allowing the movable stop to be movable between the engaged position and the disengaged position.

* * * * *